United States Patent [19]

Yamada et al.

[11] Patent Number: 4,766,157

[45] Date of Patent: Aug. 23, 1988

[54] FOAMED PARTICLES OF PROPYLENE-TYPE POLYMER

[75] Inventors: Hideaki Yamada; Satoru Hosoda; Tadatoshi Ogawa, all of Chiba, Japan

[73] Assignee: Sumitomo Chemical Company, Limited, Osaka, Japan

[21] Appl. No.: 942,043

[22] Filed: Dec. 16, 1986

Related U.S. Application Data

[63] Continuation of Ser. No. 771,916, Sep. 3, 1985, abandoned.

[30] Foreign Application Priority Data

Sep. 3, 1984 [JP] Japan .................................. 59-184135

[51] Int. Cl.$^4$ .............................................. C08J 9/22
[52] U.S. Cl. ......................................... 521/60; 521/56; 521/58
[58] Field of Search .............................. 521/56, 60, 58

[56] References Cited

U.S. PATENT DOCUMENTS

| | | | |
|---|---|---|---|
| 4,379,859 | 4/1983 | Hirosawa et al. | 521/60 |
| 4,399,087 | 8/1983 | Akiyama et al. | 521/60 |
| 4,415,680 | 11/1983 | Ushirokawa et al. | 521/60 |
| 4,436,840 | 3/1984 | Akiyama et al. | 521/60 |
| 4,443,393 | 4/1984 | Akiyama et al. | 521/58 |
| 4,448,901 | 5/1984 | Senda et al. | 521/56 |
| 4,464,484 | 8/1984 | Yoshimura et al. | 521/60 |
| 4,504,534 | 3/1985 | Adachi et al. | 521/60 |
| 4,504,601 | 3/1985 | Kuwabara et al. | 521/60 |

*Primary Examiner*—Morton Foelak
*Attorney, Agent, or Firm*—Sughrue, Mion, Zinn, Macpeak & Seas

[57] ABSTRACT

Foamed particles of propylene-type polymer of substantially non-crosslinked type, wherein the propylene-type polymer particles have a Melt Index of from 0.1 to 20, said polymer is at least one member selected from the group consisting of:

(a) a soft polypropylene homopolymer having an <mmmm> partial rate of a stereoregular pentad partial rate by $^{13}$C-NMR Spectrum of from 45 to 85% and a fusion heat quantity of from 5 to 22 cal/g; and (b) a random copolymer of propylene and an α-olefin having a carbon number of 4 or more, or a random copolymer of propylene, an α-olefin having a carbon number of 4 or more, and ethylene, in which the content of the α-olefin having a carbon number of 4 or more is from 7 to 30 mol %, the content of ethylene is 5 mol % or less, and the cold xylene-soluble matter of said copolymer is from 15 to 60 wt %, said polymer particles being foamed with the use of an evaporation type blowing agent.

6 Claims, No Drawings

FOAMED PARTICLES OF PROPYLENE-TYPE POLYMER

This is a continuation of application Ser. No. 771,916, filed 9/3/85, now abandoned.

FIELD OF THE INVENTION

The present invention relates to foamed particles of propylene-type polymers.

BACKGROUND OF THE INVENTION

Propylene-type polymers are excellent in heat resistance, chemical resistance, and rigidity, and have further excellent properties which polystyrene and polyethylene do not have. Polystyrene and polyethylene are widely used as raw materials of foamed substances in various fields, in which their properties are respectively exhibited. However, propylene-type polymers, although having the above-mentioned excellent properties, have not been fully utilized in the field of foaming.

SUMMARY OF THE INVENTION

In view of the situation mentioned above, the inventors have now attained the present invention as a result of extensive investigations regarding raw materials for obtaining foamed substances which have a chemical resistance and flexibility substantially equal to those of foamed polyethylene, and further having high heat resistance which cannot be attained by polyethylene or polystyrene-type foamed substances, and methods for manufacturing foamed particles from such materials.

Namely, by using propylene-type polymers as defined by the present invention, foamed particles in which the excellent properties of polypropylene are fully exhibited and which are satisfactory in blowing control are obtained.

Thus, the present invention is directed to foamed particles of propylene-type polymer of substantially non-crosslinked type, wherein the propylene-type polymer particles have a Melt Index (MI) of from 0.1 to 20 and are foamed with the use of an evaporation type blowing agent.

DETAILED DESCRIPTION OF THE INVENTION

Foamed substances according to the present invention can be widely used in various fields by utilizing their excellent heat resistance, chemical resistance and impact resistance; that is, the foamed substances can be used as various materials such as, for example, heat insulating materials for steam pipes, etc. which require heat resistance, cushioning materials for various machines which have a risk of adhesion or flow-out of oil-like matter; and protective materials for various large-size machines.

Heretofore, it has been considered that crosslinking by electron beams or peroxide is indispensable for high-blowing of polypropylene in view of the exemplified facts of polyethylene foamed substances. This is due to that, generally speaking, the melt viscoelasticity of polypropylene lowers remarkably above its melting point, as does polyethylene, and polypropylene is accompanied by difficulties in blowing control since the holding ability of an evaporation type blowing agent is lower than that of polystyrene.

Accordingly, the control of crosslinking is indispensable for blowing resins at a high temperature above the melting point of the resins with the use of a decomposition type blowing agent such as, for example, azodicarbonamide.

Generally, in the case of that the blowing is carried out with the use of an evaporation type blowing agent, the blowing is conducted at a temperature relatively lower than that in the case using a decomposition type blowing agent, but the blowing ability is determined by the balance between the pressure of gas due to evaporation of the blowing agent and the viscoelasticity of base material polymer.

Namely, if the viscoelasticity of the base material is excessively lower at its blowing temperature, the material cannot resist the gas pressure so that the blowing cannot be made at a high multiplication factor since the blowing agent is scattered at a high rate, and also, coarse foams are produced. On the other hand, in the case of an excessive viscoelasticity, the amount of deformation of the resin is small so that blowing with a high multiplication factor also cannot be realized. In order to obtain foamed substances having individual foams which are independent from each other, and having a high multiplication fator, it is considered that the resin has to have a suitable viscoelasticity at its blowing temperature. On account of the controllability of blowing, the wider the temperature range in which the above-mentioned suitable viscoelasticity is exhibited, the more the blowing is advantageous. In view of this point of view, the inventors have eagerly studied the blowing of propylene-type polymer particles with the use of evaporation type blowing agent, and have found that highly foamed substances can be obtained with a satisfactory controllability of blowing without any crosslinking being applied, by selecting suitable base material resins which have suitable viscoelastic properties in the vicinity of the blowing temperature. Generally, since homopolypropylene has a high melting point of above 160° C., and also has a very high viscoelasticity in comparison with that of polyethylene at a temperature below the melting point, it is not so practical to blow this polymer around its melting point since a considerably high pressure is necessary. Accordingly, in view of the above-mentiond consideration, as base material particles are selected those having an MI of from 0.1 to 20, preferably (a) homopolypropylene having a melting point of about 160° C., which has a viscoelasticity which renders it blowable at around the melting point since it has low crystallinity, and/or (b) a material whose melting point is lowered by random copolymerization between propylene and other comonomer, and which has a small variation between the viscoelasticities before and after the fusion of the material. More preferably, as a material corresponding to (a), there may be exemplified soft polypropylene which is a propylene homopolymer having an <mmmm> partial rate of stereoregular pentad partial rate by $^{13}$C-NMR spectrum of from 45 to 85% and a fusion heat quantity of from 5 to 22 cal/g, or as a material corresponding to (b), there may be exemplified random copolymer of propylene and an α-olefin having a carbon number of 4 or more, or propylene, an α-olefin having a carbon number of 4 or more and ethylene, in which the content of the α-olefin having a carbon number of 4 or more is from 7 to 30 mol%, the content of ethylene is 5 mol% or less, and the cold xylene-soluble matter of copolymer is from 15 to 60 wt%. Thus, when the above-mentioned material is selected for the base material particles and is foamed with the use of an evaporation type blowing agent, foamed particles having a high multiplication factor can be obtained without any crosslinking being applied. The material with less than 0.1 MI is low in blowability, and the material with larger than 20 MI is low in strength of the foamed substance. Therefore, these materials are not suitable for raw materials according to the present invention. It is noted here that, with the soft homopolypropylene in (a), the stereoregular pentad partial rate is measured by the method utilizing $^{13}$C-NMR spectrum proposed by A. Zambelli et al, *Macromolecules*, Vol. 6, p. 925 (1978), and the <mmmm> pentad partial rate is a partial rate of monomeric unit which exists in the center of isotactic chain, or, in other words, the chain in which five of propylene monomers are mesocoupled in series. The homopolypropylene having such a partial rate of less than 45% or a fusion heat quantity of less than 5 cal/g does not exhibit the properties of polypropylene, substantially. Meanwhile, the one having a pentad partial rate of more than 85% or a fusion heat quantity of more than 22 cal/g is nearly equal to normal homopolypropylene, so that it cannot be used as a base resin according to the present invention in view of the controllability of blowing. Next, in the copolymer corresponding to (b), an α-olefin having a carbon number of 4 or more is used, or, in addition to this, a slight amount of ethylene is combinedly used as a comonomer. As the α-olefin having a carbon number of 4 or more, butene-1, pentene-1, hexene-1, 4-methylpentene-1 may be used solely or combined, with butene-1 being preferable. The content of the α-olefin in the copolymer is from 7 to 30 mol%, and preferably from 10 to 25 mol%. Below 7 mol% the softness of the base material is lost, so that it is not suitable for high-blowing, and above 30 mol% the powder characteristic upon copolymerization is deteriorated so that stable manufacturig thereof becomes difficult.

The cold xylene-soluble matter (CXS) of propylene-type polymer used by the present invention is from 15 to 60 wt%, and preferably from 20 to 50 wt%. The copolymer whose (CXS) is below 15 wt%, the softness of the copolymer deteriorates so that it is not suitable for high-blowing. The copolymer whose (CXS) is above 60 wt%, does not exhibit, in the foamed substance, the characteristics which polypropylene normally owns.

Soft propylene-type polymers used by the present invention are preferably manufactured by what is called a gas-phase polymerizing method.

Such a method is used because if a polymerizing method using an inert hydrocarbon as a solvent is used, a large amount of soluble polymers are produced, which is not only economically disadvantageous, but also produces no soft polymer which may attain the purposes of the present invention. The polymerization may be effected with the use of a fluidized bed type reactor, a stirring type reactor, a fluidic type reactor provided with an agitator, etc.

The polymerization should be carried out under pressure and temperature conditions such that gas will not be liquified in the reactor and polymer particles will not be fused and aggregated into a mass, a particularly preferable condition being at a temperature of 40° to 100° C. and at a pressure of 1 to 50 kg/cm$^2$(G). Catalyst systems used for the manufacturing of polymer according to the present invention are catalysts for α-olefin stereoregular polymerization, such as, for example, a catalyst having, as a main component, TiCl$_3$, TiCl$_3$.⅓AlCl$_3$, or a catalyst consisting of a solid catalyst component such as, for example, a carrier carrying catalyst in which Ti compound is carried by magnesium chloride, an organoaluminum catalyst, and a third component, as necessary, such as, for example, an electron donative chemical compound.

Even components which are beforehand treated with a small amount of an olefin in the presence of an organoaluminum compound or an electron donative chemical compound, and are prepolymerized before copolymerization, can also be used as the solid catalyst component.

The evaporation type blowing agents used by the present invention include, for example, straight chain aliphatic hydrocarbons such as propane, butane, pentane, hexane, etc., alicyclic hydrocarbons such as cyclobutane, cyclopentane, etc., and halogenated hydrocarbons such as trichlorofluoromethane, dichlorodifluoromethane, dichlorotetrafluoroethane, etc. These blowing agents are added in an amount of from 2 to 25 wt% with respect to the base material particles, although the amount may vary depending upon the kinds and blowing conditions of the agents used.

As the method of adding the blowing agent, a method may be selected in which base particles are taken into a closed container into which the blowing agent is directly added to be impregnated into the blowing particles, a method may be selected in which base particles are dispersed into water within a closed container, and the blowing agent is press-charged under agitation, and so forth. Further as a method of blowing base particles, there can be suitaly selected a method in which base material particles containing therein the blowing agent is taken into a pressure resistant container and is blown by steam having a predetermined pressure, a method in which the impregnation of the blowing agent is conducted at its blowing temperature in an aqueous suspension medium under agitation, and the base material particles are blown by discharging pressure after completion of the impregnation, and so forth.

In order to obtain the foams of foamed particles, in a foamed substance, which are uniform and fine in particle size, inorganic particles may be added to a base resin. As inorganic substances having such a foam regulating effect, there may be used inorganic calcium salts such as, for example, calcium sulfate, calcium carbonate, calcium silicate, etc., silica, magnesium silicate, active alumina, etc. Further, higher fatty acid metal salts such as, for example, calcium stearate, may be used in a small amount in addition to these foam regulating agents. Upon granulation of the base particles 0.1 to 2 wt% of the foam regulating agent is desirably added and kneaded into the resin.

The present invention will be specifically explained hereinbelow in the form of examples although the present invention is not limited to these examples.

It is noted here that the melt index (MI), the fusion heat quantity (ΔHm), the cold xylene-soluble matter (CXS) and the apparent density of foamed substance mentioned in the Examples were measured by the methods described below:

(1) Melt Index

Measurement was made in accordance with JIS K6785

(2) Fusion Heat Quantity (ΔHm)

About a 10 mg sample was disposed in a DSC sample chamber (DSC Model 2 manufactured by Perkins Elmer Co.), being held therein at 190° C. for 10 minutes, and thereafter, after lowering the temperature at a rate of 5° C./min down to 30° C., the temperature was raised at a rate of 10° C./min. The fusion peak area of the sample upon raising of the temperature was compared with that of the indium standard sample (6.75 cal/g) to calculate the heat quantity.

(3) Cold Xylene-Soluble Matter (CXS)

After 1 g of polymer was dissolved into 200 ml boiling xylene, the solution was slowly cooled down to 50° C., and then, was poured into ice water while being stirred to be cooled down to 20° C. After being held for 3 hours at 20° C., precipitated polymer was filtered out. The xylene was evaporated from the filtrate, which was then dried under vacuum at 60° C., so that the polymer which is soluble in xylene at 20° C. was recovered and weighed.

(4) Pursuant to JIS K6767, the weight and volume of the foamed substance were measured.

(5) The <mmmm> partial rate was obtained from 100 MHz NMR.

EXAMPLE 1

(1) Preparation of Solid Catalyst

After taking a solution consisting of 60 ml of titanium tetrachloride and 228 ml of n-heptane into an one liter volume flask purged with argon, an n-heptane solution (300 ml) of ethylaluminum sesquichloride (136.6 ml) was added dropwise thereto at a temperature of from −5° to −10° C. over 2 hours. After completion of the dropwise addition, the solution was stirred at room temperature (i.e., about 20°-30° C.) for 30 minutes, and was heat-treated at 80° C. for one hour. After solid-liquid separation by leaving it at room temperature, the solid part was washed with 400 ml of n-heptane four times.

Next 580 ml of n-heptane and 5 ml of diethylaluminum chloride were filled in the flask, and maintained at 50° C. 32 g of propylene was gradually added at 50° C. over 2 hours while being stirred, to be prepolymerized. After solid-liquid separation, the washing was repeated twice with the use of 400 ml of n-heptane. Then, 117 ml of n-butyl ether and 3.7 ml of tri-n-octyl aluminum were added under agitation into 392 ml of toluene filled in the flask and maintained at 85° C., to conduct reaction for 15 minutes. After reaction, a solution prepared by dissolving 15.5 g of iodine into 196 ml of toluene was added into the flask and reaction was carried out at 85° C. for 45 minutes. After reaction, solid-liquid separation was conducted, washing was conducted one time with the use of 500 ml of toluene, and then was repeated three times with 500 ml of n-heptane. Thereafter, by drying under reduced pressure, 90 g of a solid catalyst containing titanium trichloride was obtained. In this solid catalyst containing titanium trichloride, 65.2 wt% of titanium trichloride was contained.

(2) Polymerization

Polymerization was conducted with the use of a fluidized bed type reactor having an internal volume of 1 m$^3$, provided with an agitator. At first, 60 kg of polypropylene particles for dispersing the catalyst were fed into the reactor, which was then purged with nitrogen and thereafter was supplied with propylene. The pressure was raised up to 5 kg/cm$^2$ (G) with propylene, and circulating gas was fed at a flow rate of 80 m$^3$/hr from the lower section of the reactor to maintain polymer particles in a fluidic condition, and then the catalysts indicated below were fed into the reactor. The catalyst components (b) and (c) were used in solutions obtained by diluting with heptane:

(a) solid catalyst containing therein titanium trichloride: 21 g
(b) diethylaluminum chloride: 112 g
(c) triethylaluminum: 11 g
(d) methyl methacryrate: 8 g Then hydrogen and propylene were fed to obtain a hydrogen concentration of 1.7 vol%, and the pressure was raised up to 10 kg/cm$^2$ (G) while the temperature of the fluidized bed was adjusted to 65° C. to initiate polymerization. During polymerization, the hydrogen concentration and pressure were maintained constant. When the bulk of the polymerization reached 75 kg, 60 kg of polymer particles were left in the reactor for next dispersion of catalyst, and the remaining copolymer particles were poured into a stirring type mixing tank into which 210 g of propylene oxide and 100 g of methanol were added. Thereafter, treatment was made at 80° C. for 30 minutes. Then the particles were dried, and a white powder-like polymer was obtained.

(3) Method of Manufacturing Foamed Particles 0.5 wt% of calcium silicate and 0.1 wt% of calcium stearate, as foam regulating agents, were added and kneaded into propylene homopolymer (MI=1.3) obtained by the method (2) and having an <mmmm> partial rate of 65% in stereoregular pentad partial rate by $^{13}$C-NMR spectrum and a fusion heat quantity of 10 cal/g, so as to be powdered to obtain polypropylene base material particles. 100 parts of base material particles, 300 parts of water, one part of a suspending agent, magnesium pyrophosphate, and 30 parts of n-butane were added into a pressure resistant container, and the system was maintained at 130° C., and was stirred for 2 hours. Leaving the system maintained at 130° C., one end of the container was opened so that uniform and fine particles were obtained. The apparent density of the foamed particles was 0.03 g/cm$^3$.

EXAMPLE 2

100 parts of base material particles, which were the same as described above Example 1, 300 parts of water, one part of a suspending agent, magnesium pyrophosphate, and 20 parts of n-butane were taken into a pressure resistant container, and were cooled down to room temperature after agitation at 60° C. for 5 hr, to obtain foamable particles containing therein 14 wt% butane. These were heated by steam at 1.7 kg/cm$^2$ (G) for 40 seconds, and uniform and fine foamed particles were obtained. The apparent density of the foamed particles was 0.05 g/cm$^3$.

COMPARISON EXAMPLES 1 AND 2

Base material particles were obtained by the same method as in Example 1, except that homopolypropylene (MI=2) having a cold xylene-soluble matter of 8% was used as the raw material polypropylene. The thus obtained base material particles were impregnated with n-butane at 90° C. in the same manner as described in Example 2, to obtain foamable particles containing therein 7 wt% of butane. The particles were blown by steam at 1.7 kg/cm$^2$ (G) and 3.7 kg/cm$^2$ (G), respectively. However, the apparent density of the foamed particles were 0.067 g/cm$^3$ and 0.33 g/cm$^3$, respectively, which were very low, and therefore, foamed substances of high multiplication factor could not be obtained.

COMPARISON EXAMPLE 3

As a raw material polypropylene, a homopolymer (MI=5) having an mmmm partial rate of 25 and a fusion heat quantity of 3 cal/g was used, and the pressure of steam was set at 1.3 kg/cm$^2$ (G). All other conditions were the same as those in Comparison Examples 1 and 2, so as to obtain foamed particles. The apparent density of the foamed particles was low as 0.10 g/cm$^3$, and a foamed substance having a high multiplication factor could not be obtained.

Examples 1 and 2 and the Comparison Examples 1 or 3 are shown in Table 1.

TABLE 1

|  | Example 1 | Example 2 | Comparison Example 1* | Comparison Example 2* | Comparison Example 3* |
| --- | --- | --- | --- | --- | --- |
| MI | 1.3 | 1.3 | 2 | 2 | 5 |
| <mmmm> Partial Rate (%) | 65 | 65 | 91 | 91 | 25 |
| Fusion Heat Quantity (cal/g) | 10 | 10 | 26 | 26 | 3 |
| Blowing Agent Impregnating Temp. (°C.)** | 130 | 60 | 90 | 90 | 40 |
| Blowing Agent Impregnating Time (hr) | 2 | 5 | 5 | 5 | 2 |
| Blowing Agent Impregnating Amount (wt %) | — | 14 | 7 | 7 | 21 |
| Blowing by Steam |  |  |  |  |  |
| Steam Pressure (kg/cm$^2$ (G)) | — | 1.7 | 1.7 | 3.7 | 1.3 |
| Blowing Time (sec) | — | 40 | 40 | 40 | 25 |
| Apparent Density of Foamed Particles (g/cm$^3$) | 0.03 | 0.05 | 0.67 | 0.33 | 0.10 |
| Shape of Foamed Particles | Uniform, Fine | Uniform, Fine | High Density Foams | High Density Foams | Coarse Foams, Large Contraction |

*Steam pressure alone was changed.
**In the step of impregnating the blowing agent, 25 parts of n-butane as a blowing agent was used with respect to the base material particles.

EXAMPLE 3

As a comonomer, butene-1 was used together to carry out polymerization. A polymerizing reaction was carried out in the same method as described in Example 1, except that a mixed gas of propylene/butene-1 (volume ratio=60/40), instead of solely propylene, was fed into the polymerizing system. Propylene/butene-1 copolymer containing therein 16 mol% of butene-1 was obtained.

The MI of this copolymer was 2.0 and the cold xylene-soluble matter thereof was 42%.

The same foam regulating agent as described in Example 1 was added and kneaded into this copolymer and then used as base material particles. 100 parts of base material particles, 300 parts of water, one part of magnesium pyrophosphate, and 25 parts n-butane were taken into a pressure resistant container, and, after being stirred at 50° C. for 3 hours, were cooled down to room temperature, whereby foamable particles containing therein 17 wt% of n-butane were obtained. The foamable particles were heated for 40 seconds with the use of steam at 1.6 kg/cm$^2$ (G), whereby uniformly and finely foamed particles having an apparent density of 0.05 g/cm$^3$ were obtained.

EXAMPLE 4

A polymerizing reaction was carried out in the same manner as described in Example 1, except that butene-1 and ethylene were used together as a copolymer and a mixed gas of propylene/butene-1/ethylene (volume ratio=55/38/7) was fed into a polymerizing system, whereby a propylene/butene-1/ethylene terpolymer containing 17 mol% of butene-1 and 2 mol% of ethylene was obtained. The MI of this terpolymer was 3.5, and the cold xylene-soluble matter thereof was 40%.

This terpolymer was granulated after the foam regulating agent was added thereto, as described in Example 1, so that base material particles were obtained. 100 parts of base material particles, 300 parts of water, one part of magnesium pyrophosphate, and 25 parts of n-butane were taken into a pressure resistant container, were stirred at 60° C. for 4 hours, and then were cooled down to room temperature, so that foamable particles containing therein 20 wt% of n-butane were obtained. The thus obtained foamable particles were heated for 30 seconds with the use of steam having a pressure of 1.5 kg/cm$^2$ (G), so that uniformly and finely foamed particles were obtained. The apparent density of the foamed particles was 0.04 g/cm$^3$.

COMPARISON EXAMPLES 4 THROUGH 7

In Example 3, the content of comonomer and the blowing condition were changed as indicated in Table 2 so that the testing was carried out.

Results of the testing are indicated in Table 2.

TABLE 2

|  | Example 3 | Example 4 | Comparison Example 4 | Comparison Example 5 | Comparison Example 6 | Comparison Example 7 |
| --- | --- | --- | --- | --- | --- | --- |
| MI | 2.0 | 3.5 | 2.0 | 1.6 | 36 | 0.05 |
| Comonomer |  |  |  |  |  |  |
| Kind | Butene-1 | Butene-1/Ethylene | Butene-1 | Butene-1 | Butene-1 | Butene-1 |
| Content (mol %) | 16 | 17/2 | 41 | 1.7 | 15 | 11 |
| Cold Xylene-Soluble Matter (wt %) | 42 | 40 | 96 | 9 | 41 | 35 |
| Blowing Agent Impregnating Temp. (°C.)** | 50 | 60 | 40 | 90 | 60 | 90 |
| Blowing Agent Impregnating Time (hr) | 3 | 4 | 2 | 4 | 4 | 4 |

TABLE 2-continued

| | Example 3 | Example 4 | Comparison Example 4 | Comparison Example 5 | Comparison Example 6 | Comparison Example 7 |
|---|---|---|---|---|---|---|
| Blowing Agent Impregnating Amount (wt %) | 17 | 20 | 23 | 10 | 18 | 14 |
| Blowing by Steam | | | | | | |
| Steam Pressure (kg/cm$^2$ (G)) | 1.6 | 1.5 | 1.3 | 1.7 | 1.7 | 2.0 |
| Blowing Time (sec) | 40 | 30 | 20 | 40 | 30 | 40 |
| Apparent Density of Foamed Particles (g/cm$^3$) | 0.05 | 0.04 | 0.28 | 0.26 | 0.06 | 0.10 |
| Shape of Foamed Particles | Uniform, Fine | Uniform, Fine | Coarse Foams, Large Contraction | High Density Foams | Fragile Foams | High Density Foams |

**In the step of impregnating the blowing agent, 25 parts of n-butane as a blowing agent was used with respect to the base material particles.

While the invention has been described in detail and with reference to specific embodiments thereof, it will be apparent to one skilled in the art that various changes and modifications can be made therein without departing from the spirit and scope thereof.

What is claimed is:

1. Foamed particles of propylene-type polymer of substantially non-crosslinked type, wherein the propylene-type polymer particles have a Melt Index of from 0.1 to 20, said polymer is at least one member selected from the group consisting of:
   (a) a soft polypropylene homopolymer having an <mmmm> partial rate of a stereoregular pentad partial rate by $^{13}$C-NMR spectrum of from 45 to 85% and a fusion heat quantity of from 5 to 22 cal/g; and
   (b) a random copolymer of propylene and an α-olefin having a carbon number of 4 or more, or a random copolymer of propylene, an α-olefin having a carbon number of 4 or more, and ethylene, in which the content of the α-olefin having a carbon number of 4 or more is from 7 to 30 mol%, the content of ethylene is 5 mol% or less, and the cold xylene-soluble matter of said copolymer is from 15 to 60 wt%, said polymer particles being foamed with the use of an evaporation type blowing agent.

2. Foamed particles of propylene-type polymer as in claim 1, wherein said α-olefin having a carbon number of 4 or more is butene-1.

3. Foamed particles of propylene-type polymer as in claim 1, wherein said propylene-type polymer is obtained by polymerization in its gaseous phase in substantial absence of a liquid medium.

4. Foamed particles of propylene-type polymer as in claim 1, wherein said polymer is at least one member selected from the group consisting of:
   (a) homopolypropylene having a melting point of about 160° C. and having a viscoelasticity which renders it blowable at around the melting point; and
   (b) a material whose melting point is lowered by random copolymerization between propylene and other comonomer, and which has a small variation between the viscoelasticities before and after the fusion of the material.

5. Foamed particles of propylene-type polymer as in claim 1, wherein the content of the α-olefin having a carbon number of 4 or more is from 10 to 25 mol%.

6. Foamed particles of propylene-type polymer as in claim 1, wherein said evaporation type blowing agent is added in an amount of from 2 to 25 wt% with respect to the propylene-type polymer.

* * * * *